March 15, 1960
J. H. McDONALD
2,928,215
LAWN MOWER SHARPENER
Filed Aug. 18, 1958
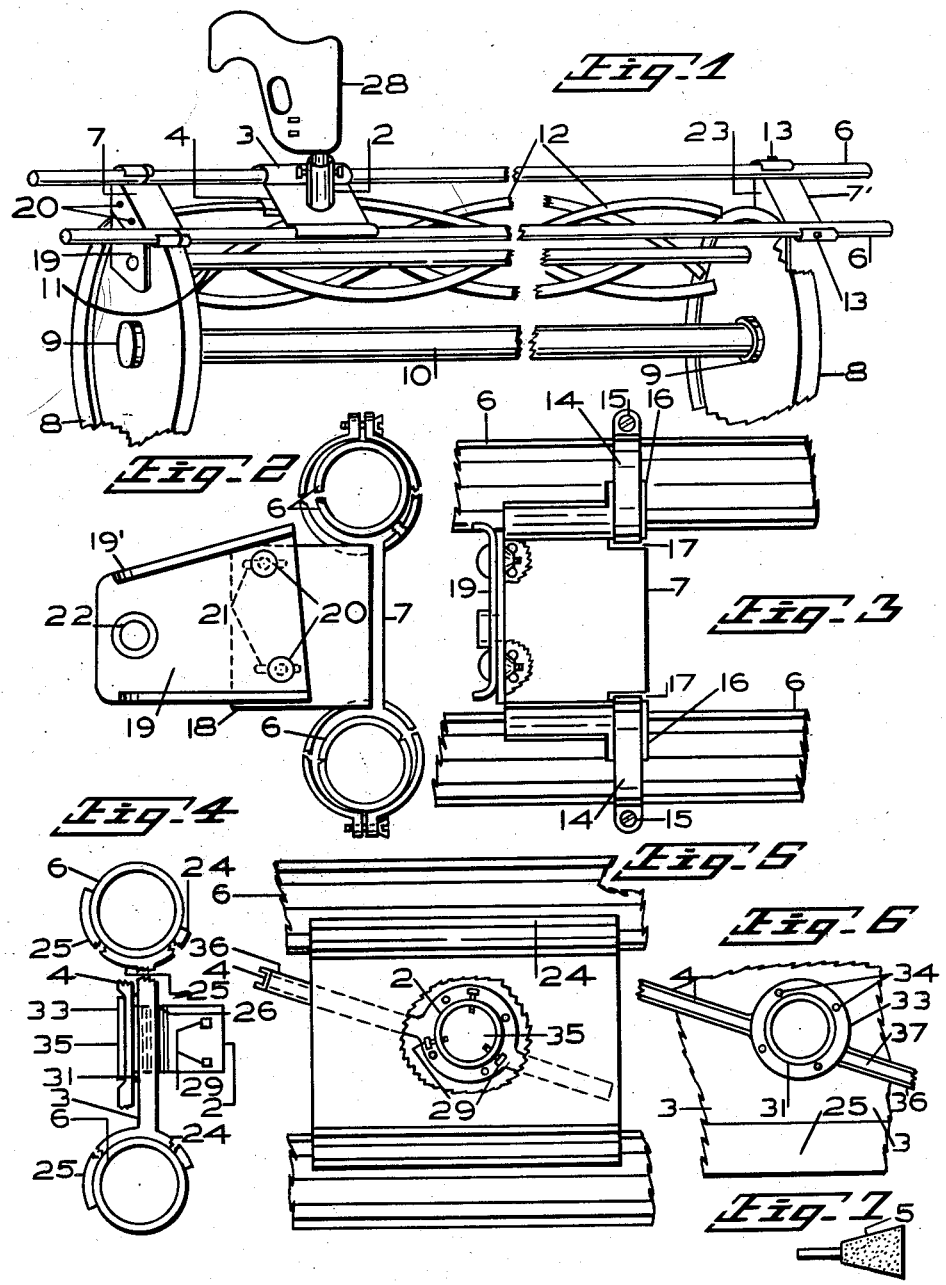

2,928,215
LAWN MOWER SHARPENER

John Hayden McDonald, North Burnaby,
British Columbia, Canada

Application August 18, 1958, Serial No. 755,453

3 Claims. (Cl. 51—173)

My invention relates to sharpening attachments for lawn mowers of a character in which the sharpening element is mounted to be moved endwise in relation to the blade to be sharpened.

In the art to which the invention relates it is a well known practice to mount a sharpening element slidable on a bar in sharpening relation to a mower blade. This involves use of a special sharpening element designed for the purpose.

The present invention contemplates improvements in this type of sharpener by provision of a pair of bars on which a cradle is free to slide endwise, the cradle being adapted to carry an electrically driven portable power unit in the chuck of which a grinding wheel cone is mounted to be used for sharpening the blade by movement of the cradle along the bars in grinding relation to a mower on the reel shaft of which the bars are supported.

In the drawings, which illustrate a preferred embodiment of the invention,

Fig. 1 is a side perspective view of my improved sharpener attachment shown mounted in sharpening relation to a mower, parts of which mower are omitted, and parts of the mower and sharpener are shown broken away.

Fig. 2 is an enlarged end view of an adjustable bracket for mounting the cradle supporting bars on the mower reel shaft and includes the cradle.

Fig. 3 is an enlarged top plan view, broken away in part, of the adjustable mounting bracket, shown attached on the cradle supporting bars, the latter being shown broken away.

Fig. 4 is an enlarged end view of the cradle, shown with parts broken away.

Fig. 5 is an enlarged top plan view of the cradle, shown mounted on fragments of supporting bars and with the cradle body broken away to disclose the blade guide.

Fig. 6 is an enlarged inverted plan view of a fragment of the cradle body with the reel blade guide attached, the latter being shown broken away.

Fig. 7 is an enlarged side view of the grinding wheel cone.

Having reference to the drawings, in Figure 1 is shown in part a mower of which 8 indicates the rubber tyred wheel, which would be rotatable on fixed hubs 9 connected by a rod 10, as is common in the art, which hubs carry a reel axle shaft 11 with cutting blades 12.

The grinding attachment comprises a pair of tubular bars 6—6 carried mounted in spaced parallel relation on brackets 7 and 7'. The bracket 7' is attachable fixed to the bars 6—6 by screws 13. The bracket 7 is attached to be endwise adjustable on the bars 6—6 by clamps 14 secured by bolts 15 in clamping relation to the bars and engaging enlarged portions 16 of the bracket 7, for which the body of the bracket is cut away as at 17.

The bracket 7 includes a depending wing 18 to which is attached a plate 19 by bolts 20 engaging in slotted openings 21 in the plate to permit vertical adjustment of the plate. The plate 19 includes an opening 22 for the reel shaft.

The bracket 7' has a depending wing 23 for engagement of the other end of the reel shaft, for which a plate corresponding to the plate 19 would be used similarly attached to the wing by bolts engaging slotted openings in the plate. These plates are interchangeable and each includes an inclined side 19' and has the opening 22 off center to the left about a quarter of an inch, this facilitating mounting the attachment.

Mounted to be endwise slidable on the bars 6—6 is a cradle adapted to carry an portable power unit with a grinding element for sharpening the blades for which purpose an electrically driven hand drill has proved most suitable. This cradle consists of a body portion 3 with integral curved upper sides 24 shaped to conform to the contour of the tubular bars 6—6 to support the cradle free to travel endwise on the bars held against displacement from the bars by lower curved under side portions 25 that are also shaped to conform to the contour of the bars, the cradle being removable from the bars endwise thereof. The upper and lower curved side portions 24 and 25 are adapted to mount the cradle on the bars spaced above the mower blades to be sharpened.

The cradle body 3 is provided with an opening 26 in which a nipple 2 is threaded forming a holder for reception of the shank of an portable electric power unit 28 and adapted to secure the unit by sets screws 29, the unit mounting an emery grinding wheel cone 5, such as is commonly used with electric hand power units.

On the under side of the cradle body 3 is an annular raised portion or boss 31 on which is mounted a reel blade guide 4 held by a washer 33 secured by screws 34 passing through suitable openings in the washer and the center ring portion 35 of the guide adapted for register the one with the other and threaded into the boss 31.

The guide 4 has arms 36 formed with side wings defining troughs 37 in which the mower blade to be sharpened is receivable. These arms are aligned off center relative to the axis of the guide to present the grinding wheel at the most effective angle to the blades.

In the use of the grinding attachment the depending wings 18 and 23 carrying the tubular bars 6—6 are engaged on the reel shaft of the mower, the wheels of the mower having first been removed, with the wing 23 of the fixed bracket 7' engaged first and the wing plate 19 of the adjustable bracket 7 then engaged and secured by the clamps 14. The reel is then adjusted with the reel guide 4 sprung into engagement with a blade to be sharpened.

The electric power unit, fitted with a grinding wheel, is next inserted in the nipple 27 and adjusted in grinding relation to the blade fixed by the screws 29. The nipple 2 is also adjustable by its threaded mounting for finer adjustment of the emery wheel in relation to the blade. The cradle is movable lengthwise over the blade while the blade is ground and the reel guide is then transferred to the next blade.

The attachment in its present form is adaptable for use with most types of mowers and is adjustable to accommodate mowers of different lengths. It is also to be understood that changes would readily be conceivable in the structure of the depending wings 18 and 23 to make them attachable to any type of mower.

Having thus particularly ascertained and determined the nature of my said invention, what I claim and wish to secure by Letters Patent is:

1. An attachment for sharpening the blades of a reel type lawn mower with a portable power unit, said unit providing a shank in which a grinding element is adapted to be carried and said mower including a reel shaft, said attachment comprising a pair of bars, brackets on which said bars are mounted in parallel spaced relationship, said brackets including depending wings in which the reel shaft is engageable, a cradle mounted to be endwise slidable on the bars, said cradle including a center opening, an upstanding nipple threaded in said opening, said nipple being adapted for engagement of the power unit shank, and a reel guide fixed to the under side of said cradle, said guide including channelled arms extending oppositely in relation to the cradle opening one to each side thereof, the channels of said arms being adapted for sliding engagement of a reel blade therein.

2. An attachment as set out in claim 1 in which the reel guide comprises a ring plate attachable to the under side of the cradle axially aligned with the cradle center opening, and the channelled arms have their medial line off center relative to the axis of the cradle opening.

3. An attachment for sharpening the blades of a reel type lawn mower of a character providing a shaft on which the mower reel is mounted, said attachment being adapted for use with a portable power unit having a shank in which a grinding element is adapted to be carried, said attachment comprising a pair of bars, brackets in which the bars are mounted in parallel spaced relation, depending wings on the brackets in which the reel shaft ends are engageable, a cradle mounted to slide endwise on said bars, said cradle having a center opening, an upstanding nipple threaded in said opening, said nipple being adapted for engagement of the shank of the portable power unit therein, means fixing the shank in the nipple adapted for vertical adjustment, and a reel guide on the under side of the cradle providing a channel in which the reel blades are endwise slidable.

References Cited in the file of this patent

UNITED STATES PATENTS

| | | |
|---|---|---|
| 1,287,445 | Rumold | Dec. 10, 1918 |
| 1,820,777 | Calhoun | Aug. 25, 1931 |
| 2,530,479 | Pater et al. | Nov. 21, 1950 |
| 2,863,262 | Turner | Dec. 9, 1958 |

FOREIGN PATENTS

| | | |
|---|---|---|
| 857,902 | Germany | Dec. 4, 1952 |